Patented May 19, 1936

2,041,561

UNITED STATES PATENT OFFICE 2,041,561

MANUFACTURE OF THEOBROMINE

Ernst Alfred Mauersberger, Maarssen, near Utrecht, Netherlands

No Drawing. Application November 5, 1935,
Serial No. 48,449

5 Claims. (Cl. 195—3)

My invention relates to an improved method of manufacturing theobromine from cocoa waste.

The method generally practiced for producing theobromine from cocoa waste consists in removing the fat from the waste, finely grinding the waste, mixing it with slaked lime and thereupon extracting this mixture with water. The product recovered in this procedure is theobromine calcium in solution. By acidulating the solution with hydrochloric acid a crude theobromine of brown color is obtained which is strongly contaminated by coloring matter and albumen compounds. This theobromine is thereupon purified by recrystallization over carbon.

This method of preparing theobromine has several disadvantages which may be enumerated as follows:—

1. The cocoa waste mixed with the lime begins to swell during extraction and thus prevents further diffusion of the water.

2. The mass fouls or becomes slimy which also contributes to the prevention of satisfactory and uniform extraction.

3. Owing to irregular and incomplete extraction the yield is inadequate.

4. The resulting crude theobromine is contaminated by albumen which it is difficult to remove.

5. The precipitated crude theobromine is contaminated by neutral and acid coloring matter which it is very difficult to remove.

The principal object of my invention is to obviate these several defects in existing methods of manufacturing theobromine and I accomplish this object by the following manufacturing phases:

A. I grind the cocoa waste to a grain size between poppy seed and pepper corn.

B. I mix the ground cocoa waste with slaked lime.

C. I heat the cocoa waste in order to rearrange the starch contained in the cocoa.

D. The cocoa waste is mixed with water and this mixture is subjected to an action in the nature of fermentation.

E. The cocoa waste treated as defined in paragraph D is extracted with water.

F. The crude theobromine is precipitated out of the extraction liquor by means of hydrochloric acid.

G. The crude theobromine is washed with soda solution to remove the acid coloring matter.

H. The resulting product is purified over theobromine calcium.

To enable my invention to be practiced by those skilled in the art the several phases above defined are described in detail as follows:

A. The cocoa may be ground in any approved manner but it is to be noted that according to my invention the grinding need not be to powder fineness but it suffices if the particles have a grain size which may vary between that of poppy seed and pepper corns and it is even better if the grain size approximates that of the pepper corn. By using this grain size there is a very large saving of power.

B. The ground cocoa waste is mixed with dry slaked lime powder. The lime may originate from mussels, limestone or from the acetylene recovery of calcium carbide. The lime should contain as closely as possible to 80% of active $Ca(OH)_2$. The mixing action is effected in any suitable mixing machine or in rotary cylinders and is completed in a few minutes. I use an excess of hydrate of lime over that theoretically required to bind the theobromine to theobromine calcium, the preferred proportion being between 20 and 30 parts of hydrate of lime to each 100 parts of ground cocoa waste. There are several reasons for using an excess of hydrate of lime. Firstly, in the succeeding treatment it liberates the glycositic bound theobromine, then it binds the free theobromine to theobromine calcium and furthermore it binds slime, sugars and coloring matters and effects albumen decomposition as well as the fermentation referred to in D. The use of less than 20% of hydrate of lime is not advantageous and the use of a greater quantity than 30% simply results in the excess acting as ballast.

C. The heating referred to in paragraph C above is not requisite if, before expressing the cocoa butter, the cocoa bean was previously roasted. The purpose of heating is to prevent the subsequent formation of a paste or sludge during the extracting step. The formation of the paste or slime is ascribable to the swelling of the starchy constituents and to the albumen reactions. The heating of the ground cocoa may be performed prior to the phase B, that is the ground cocoa may be heated before the addition of the hydrate of lime thereto, or it may be effected afterwards. The time when heating is effected depends upon the type of apparatus which is used for the heating operation. If the heating is effected by direct firing, as in drums which are externally heated, it is desirable to perform this phase of the process after the lime admixture to the ground cocoa, as otherwise the cocoa would ball up on the walls of the receptacle and adhere thereto. The cocoa which has the lime admixed therewith does not ball and adhere. The heating temperature is desirably between 130 and 200° C. A lower temperature than 130° C. produces less desirable results while if a temperature higher than 200° C. is used dark liquor is obtained in the course of the succeeding extraction. The temperature range of 130–200° C. has proven most desirable in practice.

D. The water mixing and fermenting action is effected as follows:—

The cocoa lime mixture recovered either in phase B or in phase C is moistened with water, desirable top portions being about 50-100 parts of water for each 100 parts of cocoa (equal to 120-130 parts of mixture), dependent upon the character of the cocoa, the quantity of water contained therein and upon whether or not roasted or unroasted cocoa was used. If the former, the lower limits of the proportions given above may be used, if the latter the upper limit of the quantity of water must be used. After the addition of water, the cocoa lime mixture should yield a uniform powder, and not a paste. The powder should feel moist to the touch, but it should not be sufficiently moist to permit water to be expressed from the product by balling the latter together in the hands, as in the latter case fermentation will not take place. Nor should the powder ball together in the hand; it must fall apart loosely. The powder may be very readily moistened uniformly by spraying the requisite water onto the cocoa by means of a sprinkler in the mixing machine.

As soon as the water has been added, the resulting moist powder is permitted to stand for a number of hours in the course of which it heats automatically to about 70° C. Ammonia and, primarily, amide evolutions occur. The type of fermentation herein contemplated is best effected by introducing the requisite quantity of material for an extraction operation into sacks, placing the sacks together and letting them stand for at least eight hours. The fermentation is completed within about 8-12 hours although the mass may stand for a greater length of time without injury. The temperature attained within the sacks should be at least 60° C.

The purpose of the fermentation is to effect lime binding of certain sugars and starches present in the cocoa so that, later, slime formation cannot occur. It will be apparent that the fermentation complements the phase C; it also decomposes the theobromine glycoside, converts the theobromine into theobromine calcium and finally converts the disturbing albumen bodies. At the same time undesirable coloring matter is bound. The biochemical process just described is very complicated and is not yet completely understood.

E. The next step is the extraction of the product of phase D and this extraction is effected in iron extractors, preferably rectangular in shape and coned downwardly. The usual type of extractor has a manhole in the side near the bottom of the apparatus for discharge of contents and the base of the device contains a small round filter plate approximately 50 cm. in diameter which is covered with a filter cloth and through which the filtrate discharges. These extractors are as high as they are wide at the top and their size may be such as to contain 5000 kg. of waste at a time. It will be understood that the particular extractor described forms no part of my invention and I therefore deem it unnecessary to illustrate the apparatus. About 400 parts of water are used for each 100 parts of waste, for purposes of extraction. Preferably only the first third of this extraction water is used for precipitation of theobromine, while the balance is permitted to run to the next extractor. In this manner relatively concentrated theobromine calcium liquor is obtained. Obviously any other approved extraction apparatus and method may be used. The theobromine is contained in the extraction liquor as theobromine calcium. The extraction proceeds rapidly inasmuch as the mass neither becomes slimy nor does any swelling occur in the extractor which might impede the passage of the extracting fluid. As a general thing 6-8 hours is the extracting time for extractors of about 5000 kg. capacity. The resulting extraction liquor is yellow in color and free of slime, wholly clear and without any viscosity.

F. The next step is precipitation of the crude theobromine. The extraction liquor which contains the theobromine in the form of readily soluble theobromine calcium and which has a strongly ammoniacal odor is neutralized with hydrochloric acid, as a result of which the theobromine precipitates out as a whitish to white powder. The precipitation may be so controlled that the liquor either still smells of ammonia indicating that it is weakly alkaline, or that it is neutral or, finally, that it has an acid reaction. In the first case the resulting crude theobromine is light in color while in the last case it is weakly yellowish gray because an acid coloring matter was also precipitated. The mother liquor is drawn off and may be used three to four times as the extraction liquor for new batches without any slime formation occurring. In this manner the yield of theobromine is increased owing to the quantities of theobromine remaining dissolved in the mother liquor. It should be noted that the mother liquor of extractions in which slime is formed cannot again be used. The resulting theobromine is subjected to suction and washed with water so that the product obtained is the crude theobromine.

G. It is now necessary to remove the coloring matter from the crude theobromine. Even though the precipitation has been carried up to the point of weak alkaline reaction, the crude theobromine nevertheless still contains coloring matter which renders it unsuitable for further use. I have discovered that these coloring matters are acid in character and that they dissolve in warm soda lye in which the theobromine is insoluble. Consequently, in order to decolorize the resulting crude theobromine it is treated with soda lye, the procedure being substantially this:

The theobromine while still moist is stirred with three times its quantity of a soda solution having a temperature of from 40-50° C., and containing 5% of crystal soda. This soda solution immediately becomes dark reddish brown and after about one hour of stirring the theobromine suspension in the soda solution is drawn off by a suction filter and is washed with luke warm water. The crude theobromine is now pure white.

H. The crude theobromine, produced in phase G, must be subjected to a purifying action because in addition to the fact that it may contain mechanical impurities such as cocoa waste carried along in the filter and dirt, etc. appearing during precipitation, it is not yet in commercial form. The purification is effected over theobromine calcium in concentrated form which also eliminates any traces of albumen compounds still present. A desirable purification procedure consists in stirring together in a suitable agitating vessel, for each seven parts by volume of the moist theobromine paste remaining in the suction filter two parts by volume of slaked hydrate of lime and 100 parts by volume of water and heating to about 90° C. The theobromine as well as the lime go into solution, whereupon the solution is forced through a small filter press and the filtrate is discharged into an enamelled vessel. The theobromine calcium solution, which is approximately a 10% solution, is weakly yellow in color but may be bleached pure white by treatment with hydrogen peroxide or, better still, with chlorine bleach at about 30° C. temperature. If this liquor is precipitated hot with chemically pure hydrochloric acid a heavy, sandy, pure theobromine results, while if precipitated luke warm a voluminous pure theobromine results. It will therefore be apparent that either a light or a heavy pure theobromine may be produced as desired. As indicated above, the precipitation is effected with chemically pure hydrochloric acid, the hydrochloric acid being added until neutralization occurs and thereupon a small quantity of ammonia may be added in order to maintain the solution very weakly alkaline. The precipitated pure theobromine is then drawn off, washed free of chlorine with luke warm distilled water and dried whereupon it disintegrates as powder.

To further explain the invention the following figures are given of yields obtained when phases C and D of the process are omitted. In each of the cases hereinafter mentioned 2000 kg. of crude cocoa material were used, these 2000 kg. being divided each time into four extractions of 500 kg. crude material each. The quantity of crude theobromine and its content of pure theobromine were determined. The results were as follows:

1. With phases C and D:                  Per cent
   Crude theobromine _____      2.02
   Content of pure theobromine_____       95
2. With phase D only:
   Crude theobromine _____      1.78
   Content of pure theobromine_____       83
3. Without phases C and D:
   Crude theobromine _____      1.42
   Content of pure theobromine_____       68

With reference to the foregoing experiments, it may be noted that the cocoa butter was removed by extraction to within about 1.6% from ten tons of like raw material, the cocoa beans not being pre-roasted in the expeller cake, and thereupon the extraction product was dried at about 50° C. and ground. This ground material, which thus contained the defatted cocoa beans including shells and germs, served as the starting material for the experiments.

The content of pure theobromine was determined in the following manner:

100 g. of the resulting crude theobromine of each of the three experiments, which theobromine was dried at about 50° C. and contained about 1.2% water, was dissolved in 500 ccm. of a 5% soda lye. This cold theobromine sodium solution was reacted with 20 ccm. of chlorine bleach liquor and was well agitated. Thereupon the solutions were respectively run into three measuring cylinders of one liter capacity each, the cylinders filled up to 750 ccm. with water and thoroughly agitated. These solutions were permitted to stand for two days in order to clarify. Solution 1 had no bottom deposit. Solution 2 had appreciable precipitate while solution 3 had very pronounced precipitate. Solution 1 had practically only a very weak aromatic odor (due to the bleach liquor). Solution 2 had a strongly ammoniacal odor. Solution 3 had a very strong ammoniacal odor (caused by the decomposition of albumen). 500 ccm. were withdrawn from each measuring cylinder and neutralized with concentrated hydrochloric acid. The separated theobromine, which was pure white in color, was subjected to suction by a suction filter, washed three times with 100 ccm. of water, thereupon dried and weighed. 0.8 g. was always added to the weight, as this quantity was calculated as the solution losses in the mother liquor and in the wash water. The figures obtained were increased by 50% and thus gave the yields for the 750 ccm. solution or the 100 g. crude theobromine.

I claim:
1. The herein described method of manufacturing theobromine from cocoa waste, which method comprises heating a mixture of defatted comminuted cocoa waste and lime, mixing the mass with water thereby producing a moist powder, fermenting said powder at approximately 60° C., in the absence of added ferment, treating the resulting product with an aqueous medium thereby extracting crude theobromine in the form of theobromine calcium and treating the theobromine calcium with an acidic medium thereby precipitating crude theobromine.

2. The herein described method of manufacturing theobromine from cocoa waste, which method comprises heating a mixture of defatted comminuted cocoa waste and lime, mixing the mass with water thereby producing a moist powder, fermenting said powder at approximately 60° C., in the absence of added ferment, treating the resulting product with an aqueous medium thereby extracting crude theobromine in the form of theobromine calcium, treating the theobromine calcium with an acidic medium thereby precipitating crude theobromine and treating the crude theobromine with an alkaline solution in which the theobromine is itself insoluble thereby decolorizing the crude theobromine.

3. The herein described method of manufacturing theobromine from cocoa waste, which method comprises heating a mixture of defatted comminuted cocoa waste and lime, mixing the mass with water thereby producing a moist powder, fermenting said powder at approximately 60° C., in the absence of added ferment, treating the resulting product with an aqueous medium thereby extracting crude theobromine in the form of calcium theobromine, treating the theobromine calcium with an acidic medium thereby precipitating crude theobromine and treating the crude theobromine with approximately three times its quantity of a soda solution having a temperature of from 40 to 50° C. and containing approximately 5% crystal soda, thereby decolorizing the crude theobromine.

4. The herein described method of manufacturing theobromine from cocoa waste, which method comprises heating a mixture of defatted comminuted cocoa waste and lime, mixing the mass with water thereby producing a moist powder, fermenting said powder at approximately 60° C., in the absence of added ferment, treating the resulting product with an aqueous medium thereby extracting crude theobromine in the form of theobromine calcium, treating the theobromine calcium with an acidic medium thereby precipitating crude theobromine, treating the crude theobromine with an alkaline solution in which the theobromine is itself insoluble thereby decolorizing the crude theobromine and purifying said crude theobromine with calcium theobromine.

5. The method of claim 1 in which the defatted comminuted cocoa waste is heated before being mixed with lime.

ERNST ALFRED MAUERSBERGER.